United States Patent [19]
Danek

[11] Patent Number: 6,160,620
[45] Date of Patent: Dec. 12, 2000

[54] OPTICAL CONTACT SENSOR

[75] Inventor: John E. Danek, Vestal, N.Y.

[73] Assignee: Universal Instruments Corporation, Binghamton, N.Y.

[21] Appl. No.: 09/384,758

[22] Filed: Aug. 27, 1999

[51] Int. Cl.[7] ....................................................... G01B 11/14
[52] U.S. Cl. .......................... 356/375; 356/372; 356/4.01
[58] Field of Search .................................... 356/375, 372, 356/3, 4.01, 4.07

[56] References Cited

U.S. PATENT DOCUMENTS 4,373,805  2/1983  Mallinson ..................................... 356/4

*Primary Examiner*—Frank G. Font
*Assistant Examiner*—Roy M. Punnoose
*Attorney, Agent, or Firm*—Burns, Doane, Swecker & Mathis, L.L.P.

[57] ABSTRACT

An optical sensor for use on an electronic component placement machine. A spindle tip on a placement head for the machine holds the electronic component to be placed on a printed circuit board by means of, for example, a vacuum. A spindle driver housing is mounted surrounding the spindle-spindle tip combination such that the spindle tip can move relative to the spindle driver housing vertically, due to bias mounting. A light beam from an optical emitter passes through an opening in the spindle driver housing to a first mirror mounted at 45° on a first inside surface of the spindle driver housing. The light is reflected from the first mirror to a second mirror on a second inside surface of the spindle driver housing. The second mirror is also at 45°. The light beam is then reflected from the second mirror through a second opening on the other side of the spindle driver housing to an optical receiver. When the assembly is moved to a downward position and the component comes in contact with the printed circuit board, the spindle tip stops its downward movement, but the bias mounting of the spindle tip results in the relative downward movement of the spindle driver housing relative to the spindle tip, thereby causing the top end of the spindle tip to alter the light beam between the two mirrors, and thus detect the placement of the component onto the printed circuit board.

11 Claims, 3 Drawing Sheets

OPTICAL CONTACT SENSOR

FIELD OF THE INVENTION

The present invention relates to an apparatus and method for an optical sensor to detect relative motion of two items, with particular application to detecting relative motion between a spindle tip and a spindle driver housing on an electronic component assembly machine used to place electronic components on printed circuit boards, whereby the sensor is used to determine when the component is in contact with the printed circuit board.

BACKGROUND OF THE INVENTION

In the field of electronic component assembly, sophisticated robotic manipulators are utilized to properly place electronic components on printed circuit boards. Robotic placement heads, under computer control, pick up components at supply stations, for example, by activation of a vacuum system on a spindle tip on the placement head. The placement head then moves to the correct programmed location in the X-Y coordinate system over the printed circuit board, the spindle and spindle tip are rotated to the correct theta or angular orientation, and the entire component placement head is moved downwardly in the Z direction to place the component on the board. Speed and accuracy are very important in such applications, particularly in what is known as surface mount applications where the component is placed on top of and is subsequently soldered or otherwise secured to elements on the top surface of the printed circuit board, as opposed to so-called through hole applications, where leads of the component are pushed through openings in the board. Due to the small size and sensitivity of the electronic components being surface mounted on the printed circuit board, it is critical that the electronic component not be pressed down too hard on the board. Thus, it is important to be able to determine the point where the component has been lowered the proper amount in the Z direction such that the component is in contact with the printed circuit board.

Prior art component placement systems utilized proximity sensors mounted to the spindle assembly, where the sensor had to move with the spindle assembly unit, and the associated electrical wiring for the sensors often gets tangled or damaged, resulting in reliability problems. These problems developed due to wire fatigue, problems associated with the wire guide structure, and related problems resulting from a sensor system that has moving wires.

SUMMARY OF THE INVENTION

The present invention relates to an optical impact sensor for sensing when an electronic component held by a spindle assembly has been placed on a printed circuit board. A hollow spindle tip attached at a bottom end of a spindle in the spindle assembly holds an electronic component by vacuum or the like. A spindle driver housing surrounds the spindle assembly, and means are included for biasing the spindle tip for movement relative to the spindle housing when the component is in contact with a printed circuit board. An emitter for emitting a beam of energy, such as light, and a receiver for receiving the emitted beam of energy, are also provided, together with a digital controller. Within the spindle driver housing is means for transmitting the beam of energy from the emitter to the receiver, wherein when the component is not in contact with the printed circuit board the beam of energy is uninterrupted between the emitter and the receiver, and wherein when the component is in contact with the printed circuit board the relative movement between the spindle driver housing and the spindle tip results in the beam of energy being altered.

The present invention also comprises a method for determining when an electronic component that is held by a spindle tip on a spindle assembly is in contact with a printed circuit board comprising the steps of:

directing a beam of energy, such as light, through a spindle driver housing in the spindle assembly, wherein the spindle driver housing surrounds the spindle;

biasing the spindle tip for movement relative to the spindle driver housing when the component comes in contact with the printed circuit board, such that the energy beam is altered.

DETAILED DESCRIPTION

Figures 1, 1A:
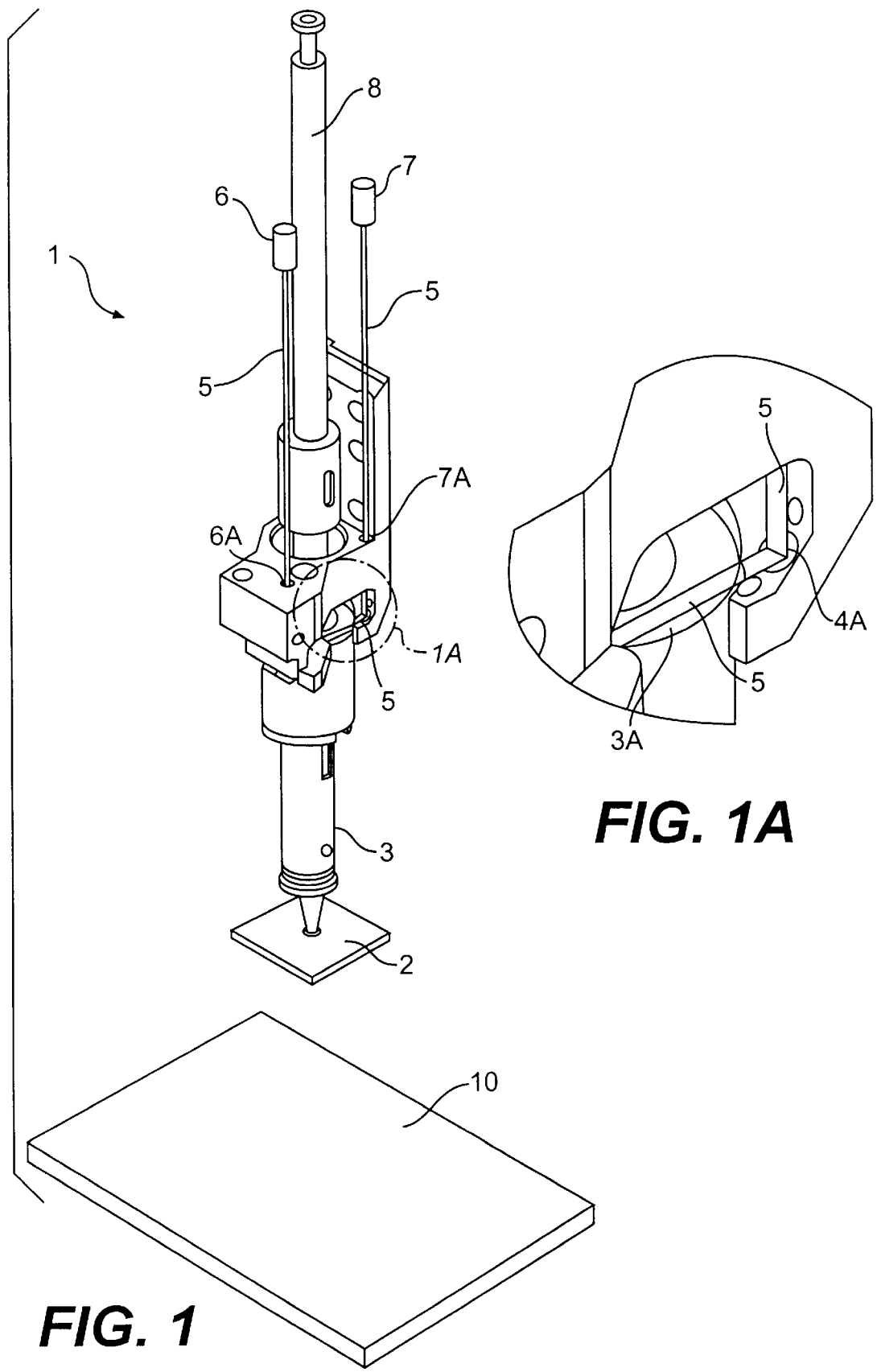
FIG. 1 is a perspective view of an embodiment of the optical contact sensor of the present invention.
FIG. 1A is a detailed view of a portion of a spindle assembly shown in FIG. 1, showing a light beam from an optical emitter reflected off of a first mirror on a first inside surface of a spindle driver housing.

An embodiment of the sensor assembly of the present invention is shown in FIG. 1. A spindle assembly 1 includes a rotating spindle 8, and at its bottom end a biased hollow spindle tip 3. An electronic component 2 is held in place at the end of the spindle tip 3 by means, for example, of a vacuum. The component 2 is to be placed on the printed circuit board 10. A spindle driver housing 9 is mounted surrounding the spindle 8 and spindle tip 3 such that when the component 2 is placed on the board 10 by movement of the entire spindle assembly 1 downwardly, the component 2 and the biased spindle tip 3 will stop their downward movement, but the spindle driver housing 9 may continue downward movement relative to the spindle tip 3 so long as downward force is applied to the spindle assembly by the placement machine.

In an embodiment of the present invention, the spindle tip 3 is spring loaded relative to the spindle driver housing 9 (compression spring 11, FIG. 4) allowing for relative movement between the spindle driver housing 9 and the spindle tip 3. Once the component 2 comes in contact with the board 10 as a result of downward force being applied to the spindle assembly 8, and the spindle tip 3 stops its downward movement, the spindle tip 3 will slide upwardly on the spindle 8 as a linear ball spline bearing 12 (FIG. 4) moves upwardly on spindle 8. This results in compression of the spring 13.

Figure 2:
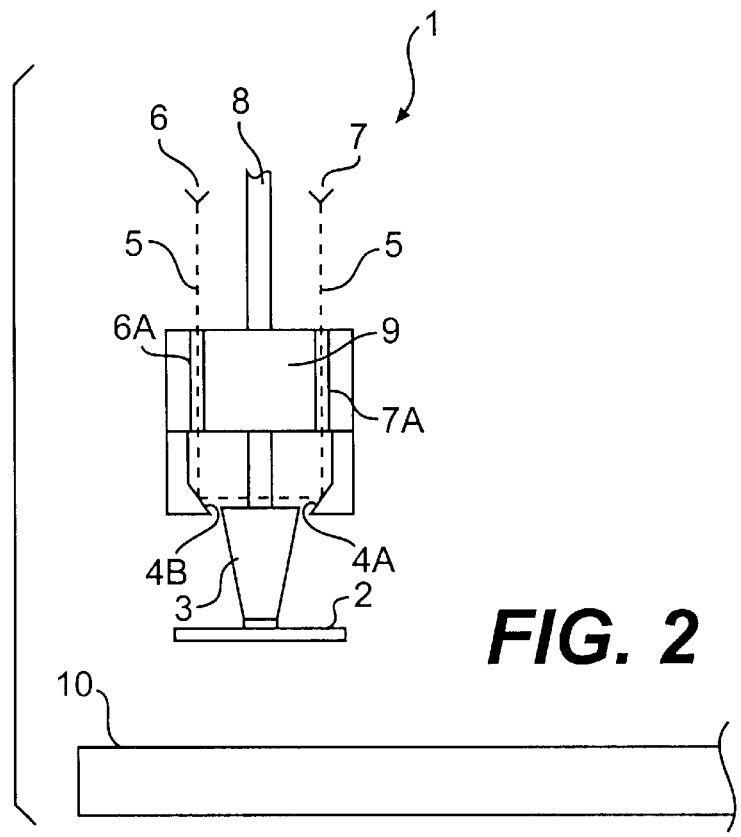
FIG. 2 is a side elevational schematic view of the embodiment shown in FIG. 1 with the spindle assembly in a position such that a component is not in contact with a printed circuit board.
Figure 3:
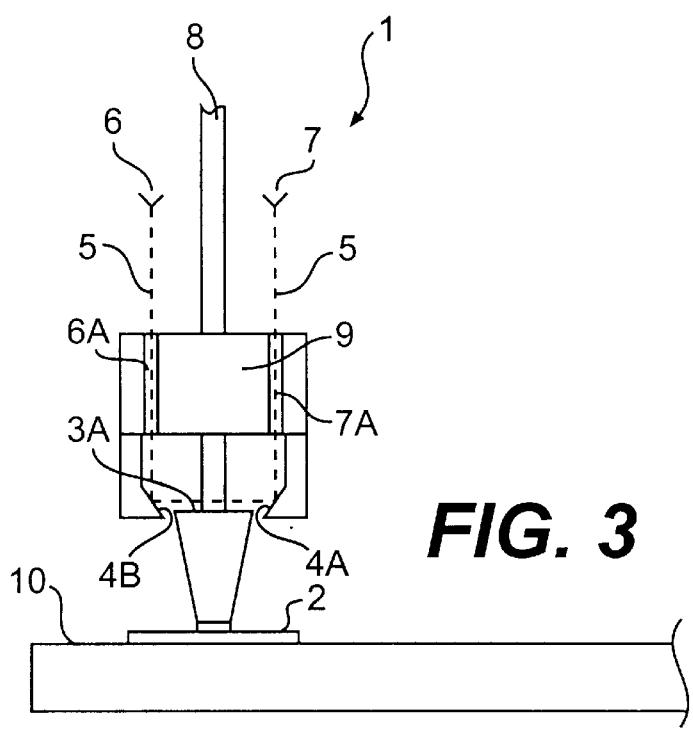
FIG. 3 is a side elevational schematic view of the embodiment shown in FIG. 1 wherein the assembly is in a position such that the component is in contact with the printed circuit board, wherein the spindle tip has moved upwardly relative to the spindle electronic component, resulting in a top end of the spindle tip breaking and thereby altering the light beam that is reflected from the first mirror on the first inside surface of the spindle driver housing to a second mirror on a second inside surface on the spindle driver housing.
Figure 4:
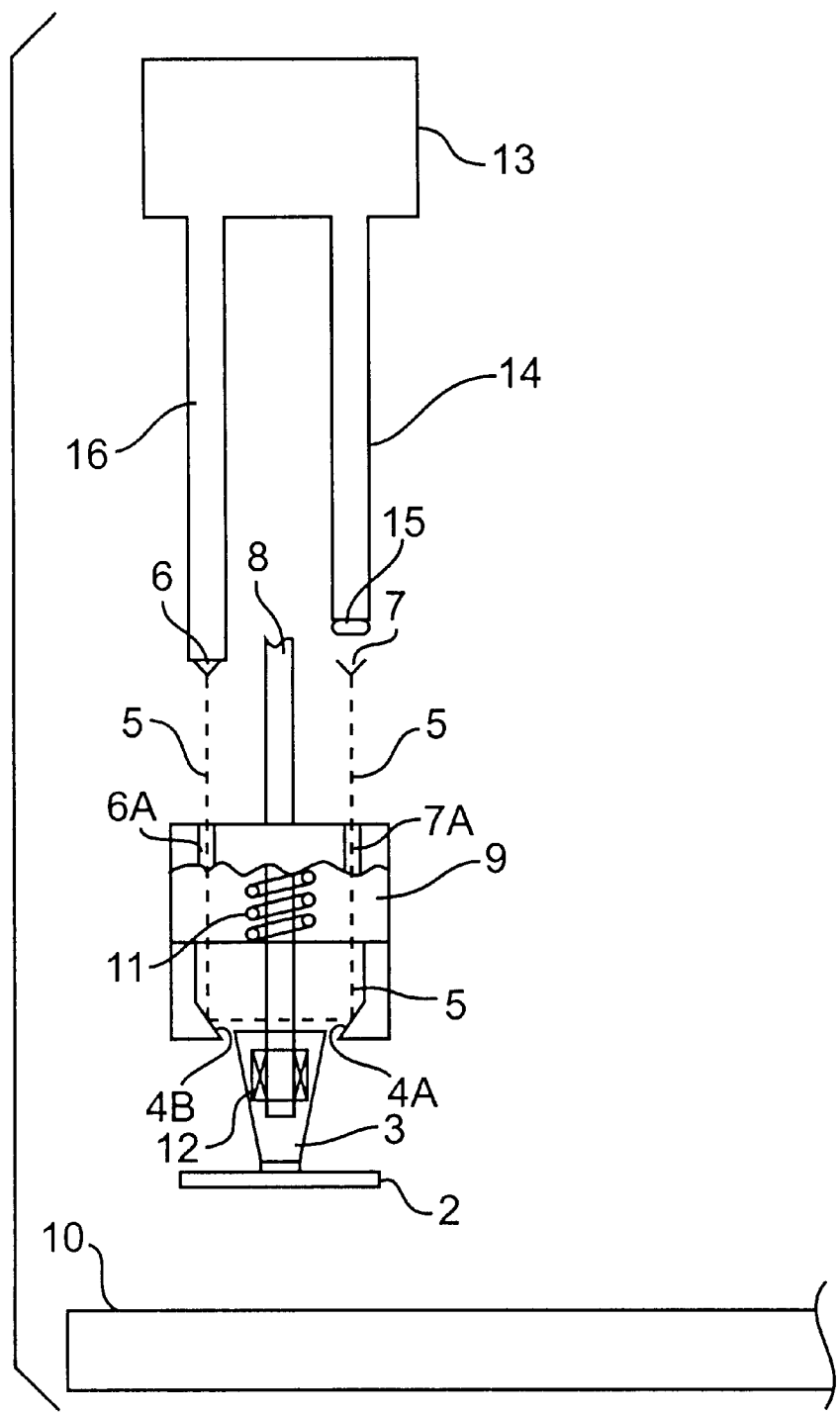
FIG. 4 is a further side elevational schematic view of the spindle assembly of FIG. 2, with a partial cutaway showing a compression spring for biasing the spindle tip relative to the spindle driver housing, and a linear ball spline bearing surrounding the spindle on which the spindle tip rides in its upward relative movement. Also showing schematically is the interconnection of a digital amplifier/light source as part of an emitter/receiver optical system.

Referring to FIG. 2, the spindle assembly 1 is shown in a position above the printed circuit board 10 prior to placement of the component 2 on the board 10. There is an energy emitting source 7, in this embodiment a source of light on one side of the spindle 8 and there is a receiver 6 on the other side of the spindle 8. One embodiment of the emitter/receiver combination is shown in FIG. 4, where the emitted light comes from a digital amplifier/light source 13, which may be, for example, an Omron model E3X-NH11, available from Omron Co. Ltd. of Japan, which utilizes an LED (light emitting diode) light source. The digital amplifier 13 is connected to the emitter location 7 of FIGS. 1–3 through fiber optic bundle 14 and appropriate lens arrangement 15, which focuses the light from the LED into a focused beam. Similarly, the receiver point 6 on FIGS. 1–3 is a fiber optic bundle 16 connected to digital amplifier 13.

The emitter 7 and receiver 6, no matter how specifically constructed, remain stationary and do not move up and down with the spindle assembly 1. Rather, the emitter 7 and receiver 6 are mounted to the placement head of the machine, and thus there are no moving wires that move up and down with the spindle assembly 1, as in the prior art systems discussed above.

Secured to or mounted on insides surfaces of the spindle driver housing 9 are two mirrors 4A and 4B, each at an angle of approximately 45° relative to the horizontal. The mirrors 4A and 4B may be surfaces of polished stainless steel, for example.

As seen in FIGS. 2 and 1, with the spindle assembly in the upward position, light beam 5 from emitter 7 travels down in a direction parallel to the direction of the spindle 8, through opening 7A in the spindle driver housing 9, hits the first mirror 4A on an inside surface on spindle driver housing 9, reflects in a path parallel to the printed circuit board 10 and perpendicular and offset to the centerline of the spindle 8. The light beam 5 reflected from mirror 4A will pass to the side of spindle 8, as seen in the detail of FIG. 1A. The light beam 5 reflected off of the first mirror 4A then hits the second mirror 4B on the spindle driver housing 9, and then is reflected upwardly through opening 6A in the spindle driver housing 9 in a direction parallel to the spindle 8 and is received in receiver 6. The path of the light beam 5 in FIGS. 1 and 2 between the two mirrors 4A and 4B passes over a top surface 3A of a spindle tip 3, as may be seen in FIG. 1A, which is a detailed view of a portion of FIG. 1. Regardless of the position in the Z plane of the spindle assembly (unless the component 2 is in contact with the board 10), the light beam 5 will pass through opening 10 in spindle driver housing 9 and reflect off mirror 4A, to mirror 4B and then to receiver 6.

When light beam 5 is received in receiver 6, this is an indication that the spindle tip 3 is in its downwardly biased position and the component 2 has not yet come into contact with the printed circuit board 10.

When the spindle 8 and spindle tip 3 with the component 2 are driven downwardly such that the component 2 comes in contact with the printed circuit board 10, the spindle tip 3 will no longer move downwardly even if the drive system continues to drive the spindle 8 downwardly. However, as the spindle 8 continues to be driven downwardly after the component comes in contact with the board 10, the spindle tip 3 with its linear ball spline bearing 12 will ride up on the spindle 8, resulting in continued relative movement downwardly of the spindle driver housing 9 relative to the spindle tip 3.

As shown in FIG. 3, this relative movement between the spindle driver housing 9 and the spindle tip 3 results in a top end 3A of the spindle tip 3 interrupting or altering the light beam 5, between mirror 4A and mirror 4B, since the mirrors 4A and 4B are mounted to and travel with the spindle driver housing 9. Thus, no light (or significantly reduced light) is received in receiver 6. At such time the amount of light received in receiver 6 results in a signal that goes below a predetermined threshold, which means that the component 2 is in contact with the board 10, the system can be programmed to stop the application of downward force on the spindle assembly 1. The amount of the placement force at the moment of contact is a known amount, as can be previously determined during machine calibration using a load cell or the like to determine that force value. If additional placement pressure is desired because of the nature of the application, the specific component, or the characteristics of the board, a further force of a known amount may continue to be applied for a specified duration of time, depending upon the force characteristics of the compression spring 13.

An advantage of the described embodiment of the present invention is that the light beam 5 and associated emitter 7, receiver 6 and mirrors 4A and 4B operate in the manner described no matter how far away or how close the component (and thus also the spindle assembly) is above the printed circuit board. The light beam 5 remains unaltered no matter what the vertical (Z axis) position of the spindle assembly, except if the component comes in contact with the printed circuit board, as described above. Although the embodiments described above contemplate breaking a light beam for detecting relative movement, the present invention also contemplates the reverse, namely, no light reaches receiver 6 until relative movement between the spindle tip 3 and the spindle driver housing 9 occurs, at which time the light beam 5 completes its path between the emitter 7 and the receiver 6.

Therefore, unlike with prior art systems that utilized proximity sensors, there is no need in the system or method of the present invention to have a complicated set of wires with associated wire retainer or holding structures that move with the spindle assembly. The system of the present invention provides greatly reliability and sensitivity over prior art systems because the system of the present invention does not have any moving wires.

Other means may be used to operate the contact sensor of the present invention, for example, a pneumatic stream of a fluid such as compressed air, visible or non-visible laser beams, or some other energy or material stream, with appropriate emitters and receivers, and appropriate internal reflectors within the spindle driver housing, such that the beam can be interrupted due to the movement of the spindle driver tip 3 relative to the housing 9.

My invention is defined by the following claims.

What is claimed is:

1. A contact sensor for sensing when an electronic component held by a spindle assembly has been placed on a printed circuit board comprising:

a spindle;

a spindle tip attached at a bottom end of the spindle;

means for holding an electronic component at a bottom end of the spindle tip;

a spindle driver housing surrounding the spindle;

means for biasing the spindle tip for movement relative to the spindle driver housing when the component is in contact with a printed circuit board;

an emitter for emitting a beam of energy;

a receiver for receiving the emitted beam of energy;

a controller electrically connected to the emitter and receiver;

means for transmitting the beam of energy from the emitter to the receiver, wherein when the component comes in contact with the printed circuit board the beam of energy is altered and the altered beam of energy detected by the controller.

2. The apparatus of claim 1 wherein the beam of energy is a beam of light.

3. The apparatus of claim 2 wherein the means for transmitting the beam of light from the emitter to the receiver comprises:

a first reflective surface on a first inside surface of the spindle driver housing; and a second reflective surface on a second inside surface of the spindle driver housing, wherein when the component is not in contact with the printed circuit board, light from the emitter reflects off of the first reflective surface to the second reflective surface, and then reflects off the second reflective surface to the receiver, and wherein when the component is in contact with the printed circuit board, a top end of the spindle tip alters the reflected light from the first reflective surface to the second reflective surface.

4. The apparatus of claim 1 wherein the means for biasing comprises a compression spring mounted between the spindle driver housing and the spindle tip.

5. The apparatus of claim 2 wherein the emitter comprises a light source, fiber optic bundle and a lens that do not move with the spindle assembly.

6. The apparatus of claim 2 wherein the receiver comprises a digital amplifier and a fiber optic bundle that do not move with the spindle assembly.

7. The apparatus of claim 1 further comprising means for applying a pre-determined amount of placement pressure to the component after the component comes in contact with the printed circuit board.

8. The apparatus of claim 4 wherein the means for biasing also comprises a bearing mounted within the spindle tip.

9. The apparatus of claim 3 wherein the first reflective surface and the second reflective surface are at approximately 45° angles relative to a horizontal plane normal to the vertical centerline of movement of the spindle.

10. A method for determining when an electronic component that is held by a spindle tip on a spindle is in contact with a printed circuit board comprising the steps of:

directing a beam of energy through a spindle driver housing in a spindle assembly, wherein the spindle driver housing surrounds the spindle; and biasing the spindle tip for relative movement to the spindle driver housing such that when the component comes in contact with the printed circuit board, the energy beam is altered.

11. The method of claim 10 further comprising the step of applying placement force of a predetermined amount to the component after the component comes in contact with the printed circuit board.

* * * * *